J. B. Fairchild,
Cage Trap,
№ 55,478.
Patented June 12, 1866.
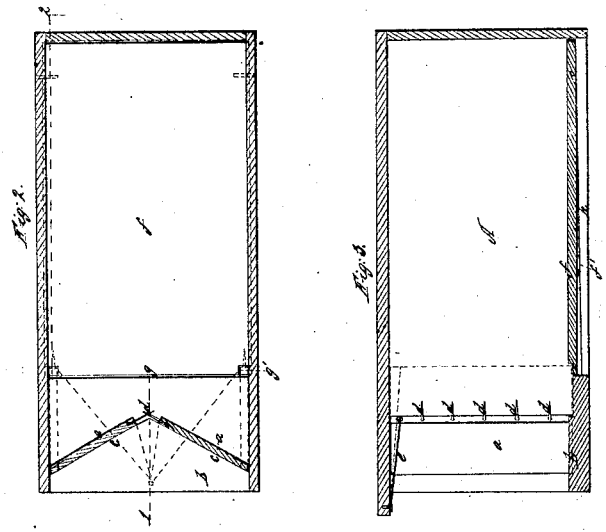
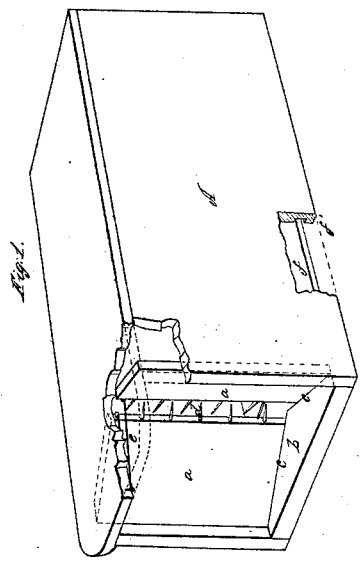
Witnesses:
Charles L. Fisher
M. T. Drake
Inventor:
Josiah B. Fairchild

UNITED STATES PATENT OFFICE.

JOSIAH B. FAIRCHILD, OF COVINGTON, KENTUCKY.

IMPROVEMENT IN ANIMAL-TRAPS.

Specification forming part of Letters Patent No. 55,478, dated June 12, 1866.

*To all whom it may concern:*

Be it known that I, JOSIAH B. FAIRCHILD, of Covington, Kenton county, and State of Kentucky, have invented a new and Improved Rat and Game Trap, of which the following is a full and clear description thereof, reference being had to the accompanying drawings, making part of this specification.

My improvement relates to the construction and arrangement of pronged folding doors and trip-floor for the purpose of effectually securing rats or game.

Figure 1 is a perspective view of my improved trap. Fig. 2 represents a longitudinal sectional plan of my improved trap, showing the folding doors in the two positions, opened and closed. Fig. 3 is a detailed view taken in vertical section longitudinally through the trip-floor, engaging the door upon one side. The section is in the red line 1 2 of Fig. 2.

A is the body of the trap, open at one end. The open or front end of the trap is provided with the folding doors $a$, which open inward and close upon the ledge $b$, secured to the floor of the trap.

The folding doors $a$ close against the wedge-shaped and inner faces, $c$, of ledge $b$. The doors do not quite meet in closing. Their closing-edges are armed with prongs $d$.

Springs $e$ keep the doors closed against the ledge $b$. A trip-floor, $f$, is pivoted between the sides of the body A near its rear end, which permits its vibration in the channels $f'$ in the sides of body A. The trip-floor $f$ extends from the rear of the trap to within a short distance of ledge $b$. The corners on the front line, $g$, are recessed. The recesses $g'$ are shallow, and are designed to receive the lower corners of folding doors $a$ when they are thrown open. A cleat, $h$, upon the inside of the trap, running the entire length of trip-floor $f$, prevents the free end of the trip-floor falling only so far as to set free the folding doors $a$.

Operation: In order to set the trap it is so placed that the floor is horizontal, the folding doors $a$ are pressed back, the trip-floor $f$ having fallen upon cleats $h$, until the closing-edges of folding doors $a$ are over the recessed corners $g'$ of trip-floor $f$. When the free end of trip-floor $f$ is elevated the lower corners of the folding doors are engaged, as shown in Figs. 2 and 3. The bait which attracts the game is placed in the trap upon the pivoted end of trip-floor $f$. As soon as the game steps upon the free end of trip-floor $f$ the pressure causes the trip-floor to fall, thus freeing the folding doors. The springs $e$, closing them with force, instantly pin between them the game entering the trap. The prongs $d$ penetrate the game at such angles that any attempt of the game to escape out of the trap only more effectually holds it. The game, if not mortally wounded, may disengage itself and enter the trap.

For large game the springs $e$ may be of steel; for small traps, such as are employed for mice or rats, the springs $e$ may be of rubber, and the sensitiveness increased by making the recesses $g'$ in the trip-floor quite shallow.

A trap constructed as above described is not only very effective, but economical.

Having fully described my improved rat and game trap and its operation, I make the following claim, which I desire to secure by Letters Patent:

The folding doors $a$, armed with prongs $d$, the springs $e$, and trip-floor $f$, in combination with the body A of the trap, all constructed and operating as above described, and for the purpose set forth.

JOSIAH B. FAIRCHILD.

Attest:
CHARLES L. FISHER,
NORMAN G. KENAN.